US006631135B1

United States Patent
Wojcik

(10) Patent No.: US 6,631,135 B1
(45) Date of Patent: Oct. 7, 2003

(54) METHOD AND APPARATUS FOR NEGOTIATING QUALITY-OF-SERVICE PARAMETERS FOR A NETWORK CONNECTION

(75) Inventor: David R. Wojcik, Morrisville, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/535,707

(22) Filed: Mar. 27, 2000

(51) Int. Cl.[7] .............................................. H04L 12/26
(52) U.S. Cl. ................................................. 370/395.21
(58) Field of Search ...................... 370/395.2, 395.3, 370/395.21, 229, 230, 230.1, 231, 232, 233, 234, 235; 379/72, 62.1, 68, 69, 70, 71, 93.26, 900, 911; 709/227, 228, 229

(56) References Cited

U.S. PATENT DOCUMENTS

| 5,488,609 A | | 1/1996 | Hluchyj et al. ............... 370/84 |
| 5,581,546 A | | 12/1996 | Roosma et al. ............. 370/253 |
| 5,592,622 A | | 1/1997 | Isfeld et al. ............ 395/200.02 |
| 5,751,698 A | | 5/1998 | Cushman et al. ............ 370/252 |
| 5,802,040 A | | 9/1998 | Park et al. ................... 370/232 |
| 5,835,484 A | * | 11/1998 | Yamato et al. .............. 370/230 |
| 5,867,499 A | | 2/1999 | Yunten ........................ 379/397 |
| 5,901,141 A | | 5/1999 | Gruber et al. ............... 370/248 |
| 5,949,757 A | | 9/1999 | Katoh et al. ................ 370/232 |
| 6,292,466 B1 | * | 9/2001 | Droz .......................... 370/232 |
| 6,304,551 B1 | * | 10/2001 | Ramamurthy et al. ...... 370/232 |
| 6,377,548 B1 | * | 4/2002 | Chuah ........................ 370/233 |
| 6,490,249 B1 | * | 12/2002 | Aboul-Magd et al. ....... 370/232 |
| 6,519,264 B1 | * | 2/2003 | Carr et al. ................... 370/449 |

OTHER PUBLICATIONS

Reisslein, Call admission for prerecorded sources with packet loss. Selected Areas in Communications, IEEE Journal, vol.: 15 Issue: 6, Aug. 1997 pp: 1167–1180.*

* cited by examiner

*Primary Examiner*—Hassan Kizou
*Assistant Examiner*—Dmitry Levitan
(74) *Attorney, Agent, or Firm*—Withrow & Terranova, PLLC

(57) ABSTRACT

Method and apparatus for negotiating quality-of-service parameters for a network connection. A cell rate profile is maintained which includes statistical quality-of-service (QoS) parameter information for each user or group of users of a cell-based communication network, such as an asynchronous transfer mode (ATM) network. A router or similar device makes use of specific parameter values for specific times from the cell rate profile to negotiate appropriate network connections having just the right amount of allocated bandwidth for a given connection. Preferably, the router handles the process completely automatically; however, the cell rate profile can be accessed to provide graphical information to users so that an appropriate choice can be made manually.

19 Claims, 8 Drawing Sheets

METHOD AND APPARATUS FOR NEGOTIATING QUALITY-OF-SERVICE PARAMETERS FOR A NETWORK CONNECTION

CROSS REFERENCE TO RELATED APPLICATION

Some of what is disclosed in this application is also disclosed in U.S. patent application Ser. No. 09/501,484, filed Feb. 9, 2000, which is assigned to the assignee of the present invention, and which is incorporated herein by reference.

BACKGROUND

1. Field of the Invention

This invention relates to ways of automatically or semi-automatically negotiating on quality-of-service (QoS) parameters for customer connections to a cell-based communication network. The invention is particularly appropriate for use in asynchronous transfer mode (ATM) networks.

2. Description of the Problem

High speed, digital communication networks have become critical for transporting information in our modern society. To meet this need, ATM has evolved into the high bandwidth, cell-based digital communication protocol of choice. ATM offers an advantageous transport structure for digital communications by using a high bandwidth, multiplexing scheme for the transmission of messages. ATM systems communicate information using fixed-size cells of relatively short length. U.S. Pat. No. 5,867,499, issued Feb. 2, 1999, provides some discussion of the format of ATM cells, and the workings of an ATM network and is incorporated herein by reference.

With the ever-increasing demand for bandwidth, the ability to provide different levels of quality of service (QoS) is and will continue to be critical in the design of new ATM products. QoS can essentially be equated to the amount of bandwidth provided and/or permitted for a given connection. This bandwidth is measured by the number of 53 byte ATM cells flowing through a given connection or group of connections per second. The level of QoS (or bandwidth) provided to a specific customer or client is determined by a contract that is established between the service provider and the client. These contracts typically specify various cell rate parameters that will be guaranteed for the duration of a client's connection to the network. If a client exceeds the parameters of its contract, its ATM cells may be discarded, thereby degrading the performance of its connection.

For ATM, QoS categories are defined by well-known standards. For example, see the book, "ATM User Network Interface (UNI) Specification Version 3.1" by the ATM Forum, published by Prentice Hall PTR, June, 1995, which is incorporated herein by reference. There are currently five QoS categories defined by the ATM forum as discussed in the UNI 3.1 Specification. They are:

Constant Bit Rate (CBR)—Used by connections that request a static amount of bandwidth that is continuously available during the connection lifetime. CBR service is intended to support real-time applications requiring tightly constrained delay variation (e.g., voice, video, circuit emulation) and is characterized by a Peak Cell Rate (PCR) value.

Real-Time Variable Bit Rate (rt-VBR)—Used for real-time applications requiring tightly constrained delay and delay variation (e.g., voice, video). Unlike CBR, these types of connections are expected to transmit at a rate which varies with time or is "bursty". This service category is characterized in terms of a Peak Cell Rate (PCR), Sustainable Cell Rate (SCR), and Maximum Burst Size (MBS) and a maximum Cell Transfer Delay (CTD).

Non-Real-Time Variable Bit Rate (nrt-VBR)—Used for non-real-time applications which have bursty traffic characteristics. This service category is characterized in the same manner as the rt-VBR category but without regard for CTD.

Unspecific Bit Rate (UBR)—This service category is intended for non-real-time applications which do not require tightly constrained delay and delay variation such as file transfer and email. UBR does not specify traffic related service guarantees.

Available Bit Rate (ABR)—ABR is an ATM layer service category for which the limiting ATM layer transfer characteristics provided by the network may change subsequent to connection establishment. A flow control mechanism is specified which supports several types of feedback to control the source through specific control cells called Resource Management (RM) cells. It does not bound the delay or delay variation of cells on a given connection and is not intended to support real-time applications. When an ABR connection is established, the end-system specifies a maximum required bandwidth (PCR) and a minimum usable bandwidth or minimum cell rate (MCR).

Devices exist that can be used to monitor some or all of the traffic parameters discussed above. Typically, the devices store statistical parameter information for a given connection. The information can then be retrieved later and used by the service provider to provide customer assistance, or to make appropriate changes to the network. However, every time a user connects to an ATM network, the user must specify both the service category and the traffic parameters. The network is then examined to determine its available bandwidth and an access device either grants or denies access accordingly. The service category is relatively easy for users to understand, and often remains the same over many connections. However, the average user has little understanding of parameters such as PCR, Cell Delay Variation Tolerance (CDVT), SCR, MBS or MCR, and even those users who do understand these measurements are unlikely to know what values to specify for a given access request. There exists a serious need for a way to provide access to cell rate information for a user or group of users, so that each user can either manually or automatically make an informed decision on QoS parameters when setting up a network connection. If users can make the proper decisions when requesting bandwidth, enough bandwidth will be available for applications without the users having to request too much. Therefore, each customer only pays for what it needs and the service provider has more bandwidth available for additionally customers.

SUMMARY

The present invention meets the above need by maintaining and accessing a cell rate profile, which includes statistical quality-of-service (QoS) parameter information for each user or group of users of a cell-based communication network, such as an ATM network. The statistical QoS parameter information includes historical records for each QoS parameter for a given category of service over time. Ideally, information is available for all service categories that a particular user or group of users might need. In the preferred embodiment, the statistical QoS parameter information is accessed by a customer device such as a router, and is used to manage access under the network's connection admission control (CAC) and traffic policing policies. In this embodiment, the router automatically specifies the proper parameters so that the allocated bandwidth is optimized for each connection. In an alternative embodiment, statistical information for one or more QoS parameters is provided graphically to a user so that the user can make an informed decision when requesting a connection.

I use the term "network connection" to generically refer to any customer data connection. A specific "virtual connection" through the network carries the information from a user, and forms the most important part of the network connection. The virtual connection is specified by a virtual path identifier (VPI) and a virtual channel identifier (VCI). According to the preferred embodiment of the present invention, a method is implemented which involves accessing the cell rate profile that applies to a given, requested virtual connection for a network connection. After checking the current time, the value of a selected QoS parameter, or selected QoS parameters corresponding the current time is or are determined by accessing information from the cell rate profile. If the current value for the QoS parameter is the same as the selected value for the QoS parameter, the virtual connection (VC) is opened or maintained using the current value. However, if the selected parameter value is different than the current parameter value, a new virtual connection for the network connection is opened using the selected value for the current time, and traffic is routed or rerouted to the new connection.

The above method is executed whenever a new connection is requested. However, it is also desirable to execute the method at regular time intervals, to check the needs of the existing connections. If a parameter value has changed for an existing network connection, the connection is moved to a new virtual connection with the appropriate parameter value and the old virtual connection is terminated. In this way, the parameters for a given network connection are continuously adjusted for increases and decreases in traffic. If there has been no traffic since the last check, the virtual connection for the specific user is completely terminated. It is also desirable to maintain a set of parameter values when the network is just starting up and no connections have been made yet. These initialization values can be used whenever the statistical value of a QoS parameter for a specific time in question is equal to zero, but a connection is needed for which the value cannot be zero.

The method described above is preferably executed on a router or similar device which manages a customer's connections to the network. Such a device typically includes a processor card and a plurality of input/output adapters for connection to various networks. The router also includes computer program code to control its operation. The computer program code together with the hardware provides the means to perform the method of the invention. The computer program code can be stored independently from the device or transported over a network for shipping, backup, or archival purposes. If the code is stored, a storage media is used. The media can be magnetic such as diskette, tape or fixed disk, or optical such as a CD-ROM.

In the preferred embodiment, the invention is used in a cell-based communication network including an edge device with a network interface. The edge device is also connected to a router. The edge device is controlled by a central processing unit (CPU) and includes, or has associated with it, hardware for maintaining the cell rate profiles. The router negotiates connections using one or more QoS parameter values which are stored in the cell rate profile. The router preferably downloads the values and negotiates connections automatically using the previously described method. Alternatively, the router can download the QoS parameter information into a user workstation. Software and hardware in the workstation enables the workstation to provide an easy-to-read graphical display for the user so that the user can make parameter decisions. Yet another alternative is to maintain a web site connected to the router and/or the edge device. The web site can receive the parameter information and, provide the parameter information to the router, format the QoS parameter values for graphical display, or both. If a web site is used, the user can display the data on his or her terminal using readily available web browsing software.

BRIEF DESCRIPTION OF THE DRAWINGS

FIG. 4 is divided into FIGS. 4-A and 4-B for convenience.

DETAILED DESCRIPTION

Figure 1:
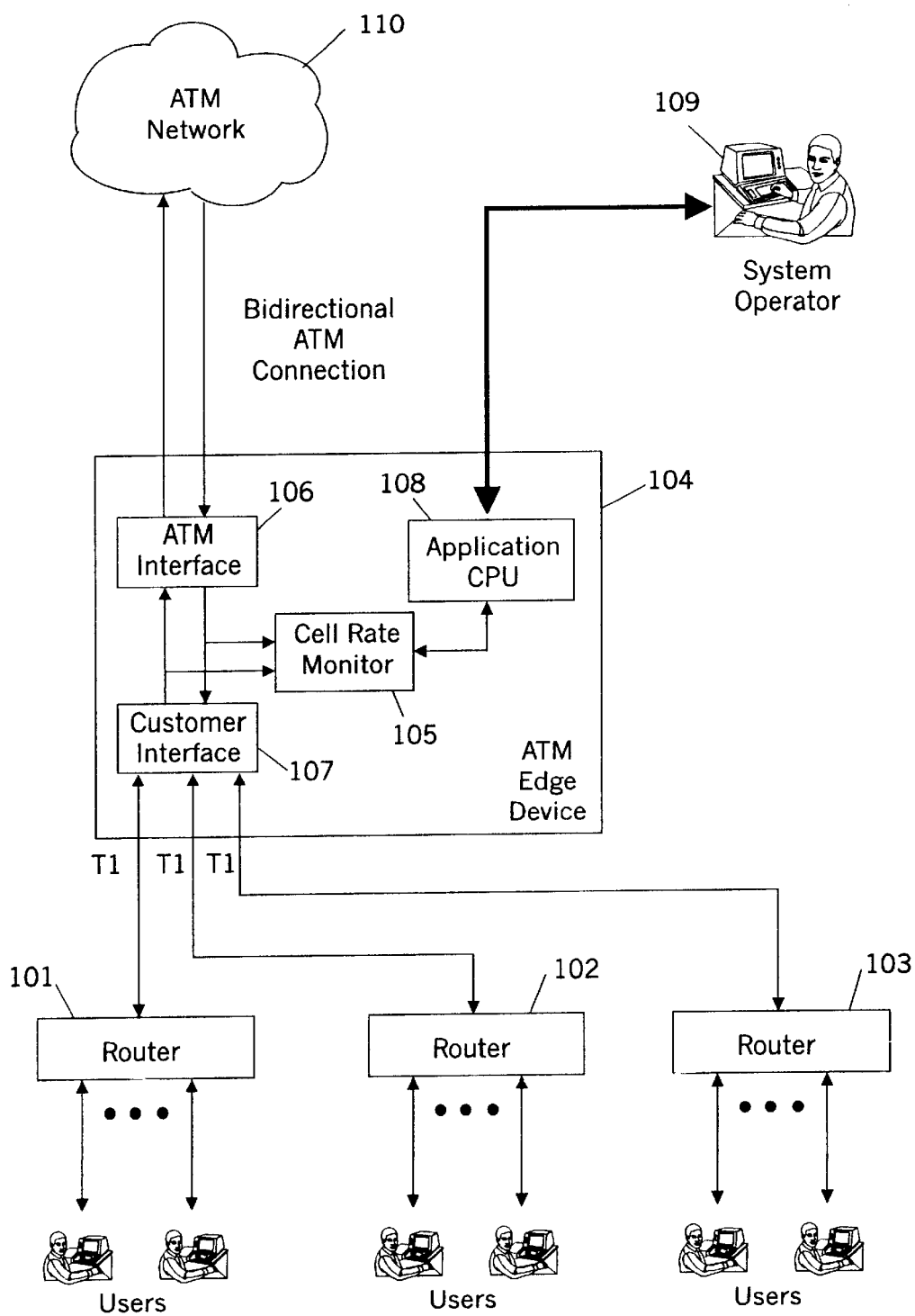
FIG. 1 illustrates the preferred embodiment of the network in which the present invention is used.

One network in which the invention is used is illustrated in FIG. 1. FIG. 1 shows groups of users on Internet protocol (IP) subnets who have access to the ATM network 110 via the ATM network interface, 106, via intelligent routers, 101, 102 and 103. Each router connects to the ATM backbone through a T1 line going to an ATM edge device, 104. The T1 lines interface with edge device 104 via customer interface 107. Each router converts the IP packets on its subnet into ATM cells and sends them to the edge device, which in turn forwards them to the ATM network, 110. As shown in the figure, each router has one bi-directional virtual connection to the edge device 104. Within or near the edge device, a device collects real-time statistics on each router's T1 connection.

At any time the operator, 109, or a user may access and display the ATM cell rate statistics collected. Although there is virtually an unlimited number of ways to graphically display these statistics, some examples are listed below.

1. PCR vs. Time of Day
2. PCR vs. MBS
3. Average Cell Rate vs. Time of Day
4. CDV vs. Time of Day
5. Daily Average Cell Rate over 1 Month Period
6. Minimum Cell Rate vs. Time of Day Preferably, all of these statistics are provided to both the users and operator. However, any one of these statistics, if provided to the user or user's router for the specific category most often used, allows the invention to be implemented.

As previously stated, it is necessary for a device to be resident in the network within the edge device to collect real-time connection statistics. This device is used to develop a cell rate profile for each user or group of users, who can access the cell rate profile over the T1 connection, or possibly through a separate server. The details of access to the profile are discussed later in reference to FIG. 5. There are various alternatives available for collection of the statistics. A separate piece of equipment, external to the edge device can be used. However, it is preferable to include the cell rate monitor, 105, in the edge device 104. The cell rate monitor is fully described in the related application. Access to statistics within the cell rate monitor is provided by the application CPU 108 within edge device 104 of FIG. 1

The cell rate monitor includes a cell processor that captures cells at a network interface. A bus arbiter and a communication buffer together with an internal bus form a bus subsystem. The bus subsystem is essentially an internal bus system with control and data lines. These control and data lines have an application processor interface that connects to the application CPU, 108 of FIG. 1. The cell rate monitor includes a statistics memory.

In real time, the cell processor (CP) captures and processes the statistics for cells with specific characteristics as requested by the application CPU (ACPU). The ACPU can be any processor which has been assigned a task which requires the statistics as input. It can be the processor which is part of a computing module controlling the operation of an ATM device, or it can be a processor which is provided specifically to report cell statistics to a network operator. In order to capture statistics, the CP passively monitors the bi-directional ATM cell flow (or any two ATM cell flows) at the network interface and copies the cells for statistical analysis. Only those connections requested by the external ACPU are monitored and, within those connections, only the requested ATM cell types are monitored. The ACPU requests connections related to a user who needs a cell rate profile to be monitored. Once a cell has been captured, the header and payload information necessary for cell identification and the calculation of QoS statistics is retained. The CP reads the cell's existing statistics from the statistics memory (SM) and recalculates each value based on the cell's previous and current arrival time and other information within the cell. At any time, the ACPU may access the SM to gather the current measurements.

Figure 2:
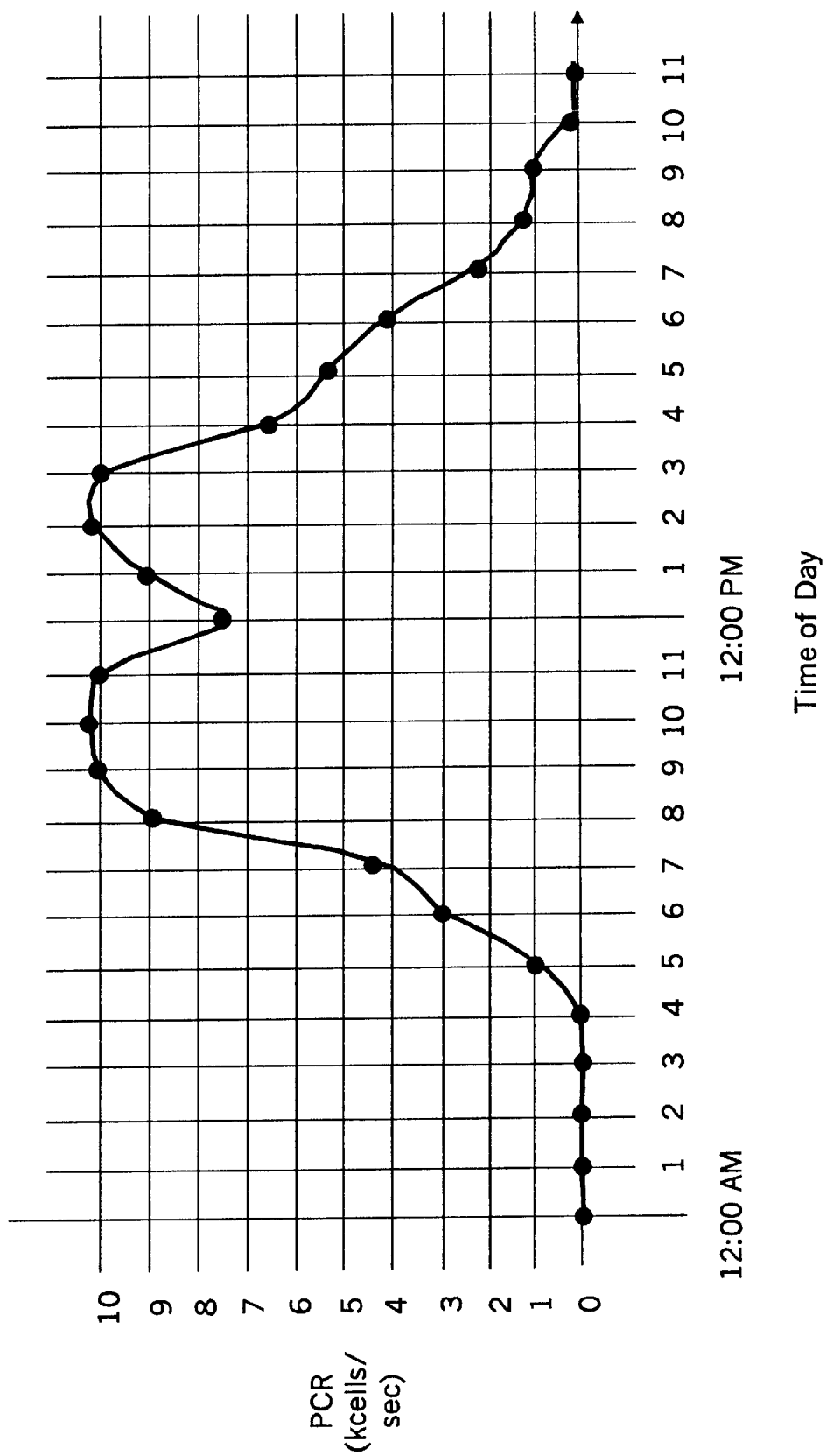
FIG. 2 illustrates a graph of one of the QoS parameters as related to time-of-day, such as might be displayed using cell rate profile data according to the invention.

With the availability of statistics which indicate cell rates over time, it becomes possible for the user or user equipment to optimize the requested cell rate parameters of a connection when the request for that connection is initiated and to request adjustments to that connection as time goes on. Considering the example shown in FIG. 1, at a given time of day, say 5:00 AM, there may be only a few users of the IP subnet and, consequently very little ATM traffic between the router and the ATM edge device. But as the day goes on, the number of users logged in and the amount of bandwidth needed can change drastically. Access to the statistics for the router over an average day can be used to determine the traffic parameters for a connection request. A graph of the PCR for the router over time might look as shown in FIG. 2. A graph of MBS for the router over time might look as shown in FIG. 3

Figure 3:
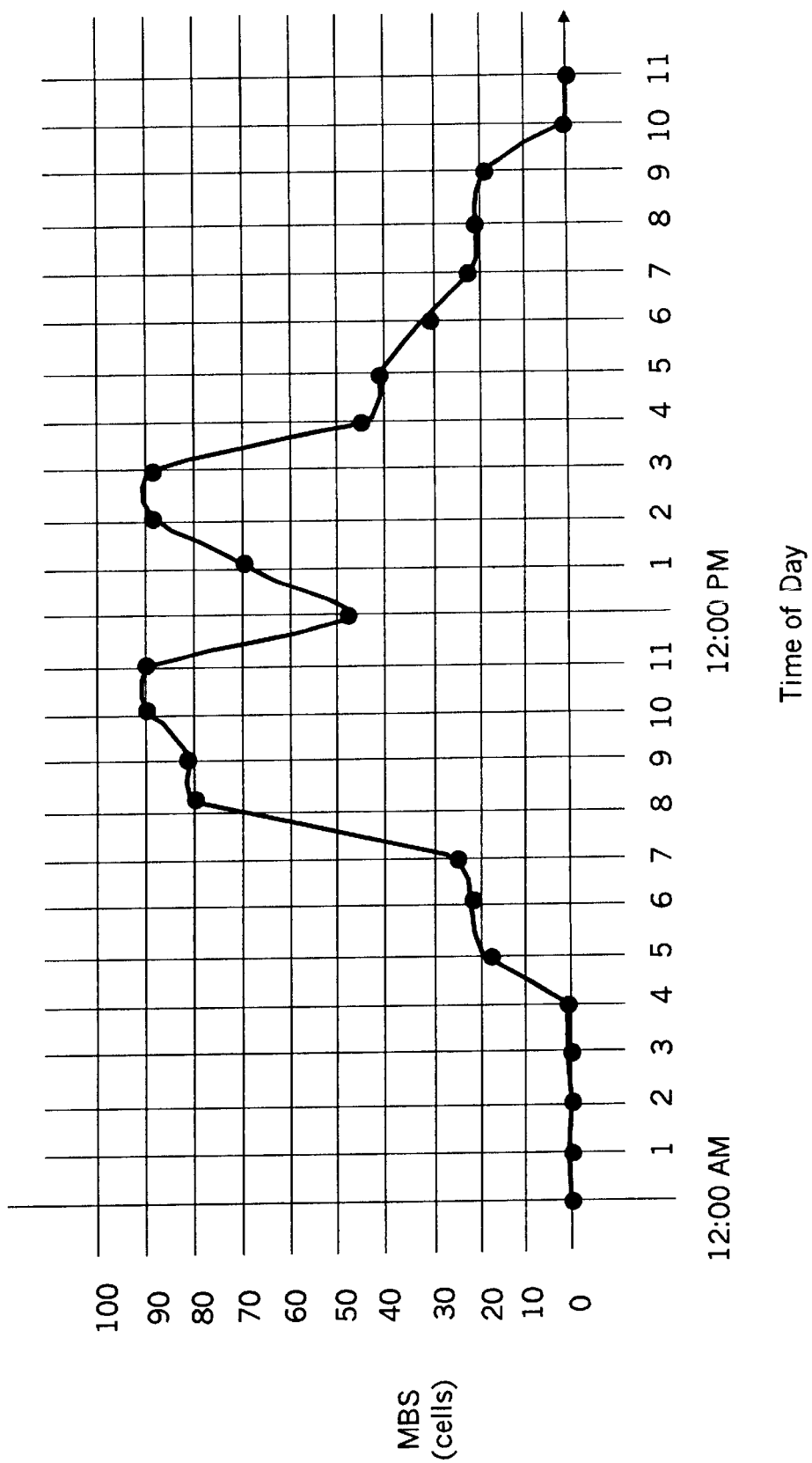
FIG. 3 illustrates a graph of another one of the QoS parameters as related to time-of-day.
Figure 4A:
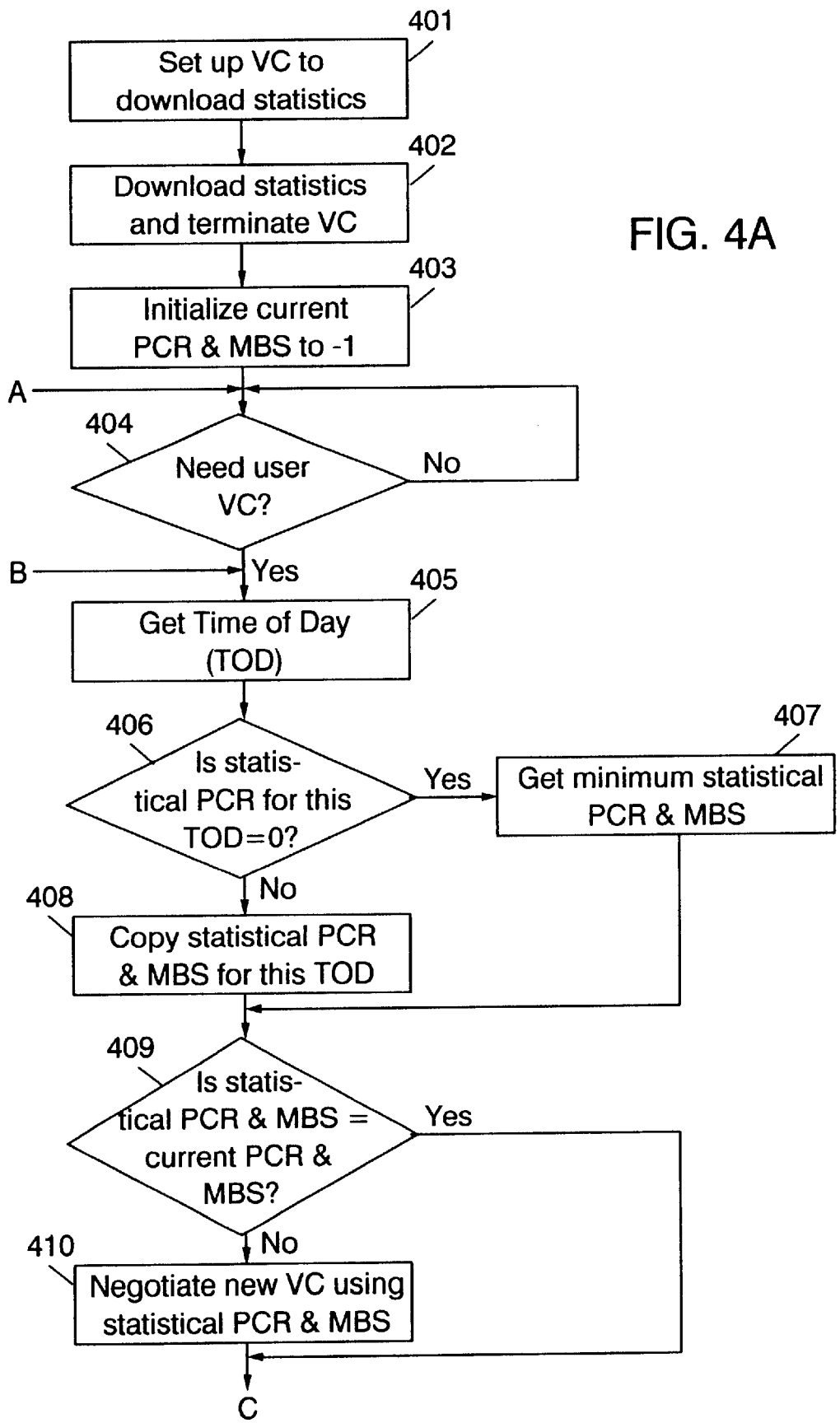
FIG. 4 shows a flowchart which illustrates the method of the present invention.
Figure 4B:
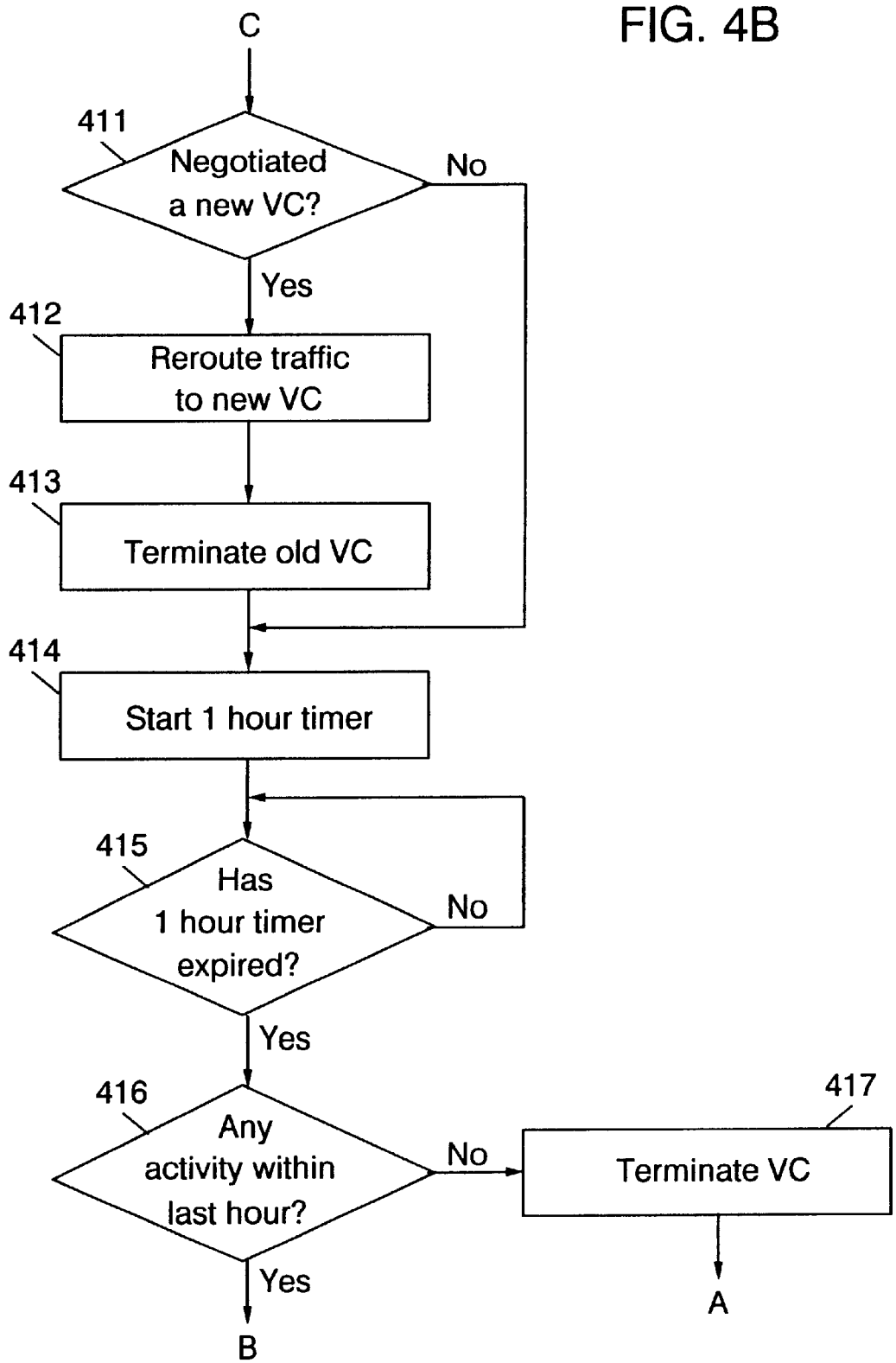

It can be seen from FIGS. 2 and 3 that the Peak Cell Rate (PCR) at 5:00 AM typically does not exceed 1000 cells/second and the Maximum Burst Size (MBS) is 20 cells. The router can use this information to set up the contract with the ATM edge device when initiating its virtual connection (VC). An example of such a procedure executing on the router is shown in FIG. 4. The flowchart begins with the power-up initialization of the router and then continues to set up and terminate ATM VC's between the router and the ATM edge device as needed. Optionally, the user may manually enter the traffic parameters by accessing the statistics information.

The statistics download to the router begins at 401 at FIG. 4, where the router sets up a VC solely for the purposes of downloading initial statistics. At 402 the VC is terminated and at 403 the stored PCR and MBS is initialized to negative one (−1). The value −1 signifies that the system has just been initialized, since it is not a possible actual value for the parameters. Note that zero cannot be used as an initialization value since the PCR and MBS can both actually have a value of zero. At 404 the router waits to determine if and when a user needs a VC. When a user needs a VC, the current time of day is fetched at 405. At 408, the statistical information, that is the parameter values for this time of day, in this case the PCR and MBS, is copied. If either value is zero at 406, a minimum value is set at 407. At 409 a comparison is made between each fetched, selected QoS parameter and the contracted current QoS parameter for the existing connection, or the next new connection if no connection for this user currently exists. If the two are not equal, a virtual connection is negotiated for the network connection, using the new parameter values. If the two are equal, the current connection, if any, is maintained. In either case the program branches to C, which is shown in part B of FIG. 4.

At step 411, a determination is made as to whether traffic needs to be routed to a new VC from an old VC. If so, traffic is rerouted at 412, and the old VC is terminated at 413. Note that if the required parameters have not changed for an existing connection, the flow progresses from the point where the time-of-day is fetched at 405, through to just after step 413 with no rerouting of traffic. Note there are also numerous ways to handle the initial setting of the parameters and the fetching of new parameters. The initial download of statistics can simply be initial values to be used in contracting for a new connection. In this case, any fetching of new statistics, for example, at step 408, can be from the edge device over a separate virtual connection. Alternatively, all the statistics can be downloaded into the router as a complete set of data, on power-up and/or at regular intervals. In this case the process shown in FIG. 4 takes place mostly internal to the router. It should also be noted that when a user VC is needed for a completely new connection, there is no existing VC. In the process steps shown at 405–410, the current parameter values are initial minimum values, rather than values for an existing connection. In the latter case, the rerouting at 412 and the termination step at 413 are skipped.

The propriety of the parameters for the connection negotiated above is preferably continuously checked. The rest of FIG. 4-B illustrates this process. At 414 and 415 a timer is run. Upon expiration of the timer, a determination is made as to whether there has been any activity for the VC in question at 416. If not, the VC is terminated at 417 and the process returns to point A in the part of the flowchart shown in FIG. 4-A. If so, the process returns to point B instead, the time-of-day is fetched, and the process repeats. In this way, the bandwidth is increased or decreased if needed each time the process repeats. A user only pays for the bandwidth needed, no more and no less. In the example of FIG. 4, the time interval chosen for checking the VC parameters is one hour. This is an arbitrary choice, based on engineering considerations. A shorter time period will result in more closely matching contracted bandwidth with needs, but if the time period is too short, too much processing overhead may go towards negotiating virtual connections with the proper parameters as opposed to sending and receiving user data.

There are two ways for the user to access the statistics collected by the cell rate monitor. The first, the same as described in the flowchart, is through a separate connection set up by the user device (in this case the router) to download the statistics. In this case software for viewing can be installed on the user workstation which downloads the statistics if a graphical display is desired. The router itself contains the software which downloads the cell rate statistics and fills in the contract parameters upon negotiation or renegotiation of a connection.

The second is via a web site maintained by the service provider. Such a web site would be accessible by both the router and the user. The router still downloads the necessary statistics for automated contract negotiation but the user would be able to access the site directly to get graphical displays of usage statistics without having to have special software capable of capturing downloaded statistics and translating them into graphical displays.

Figure 5:
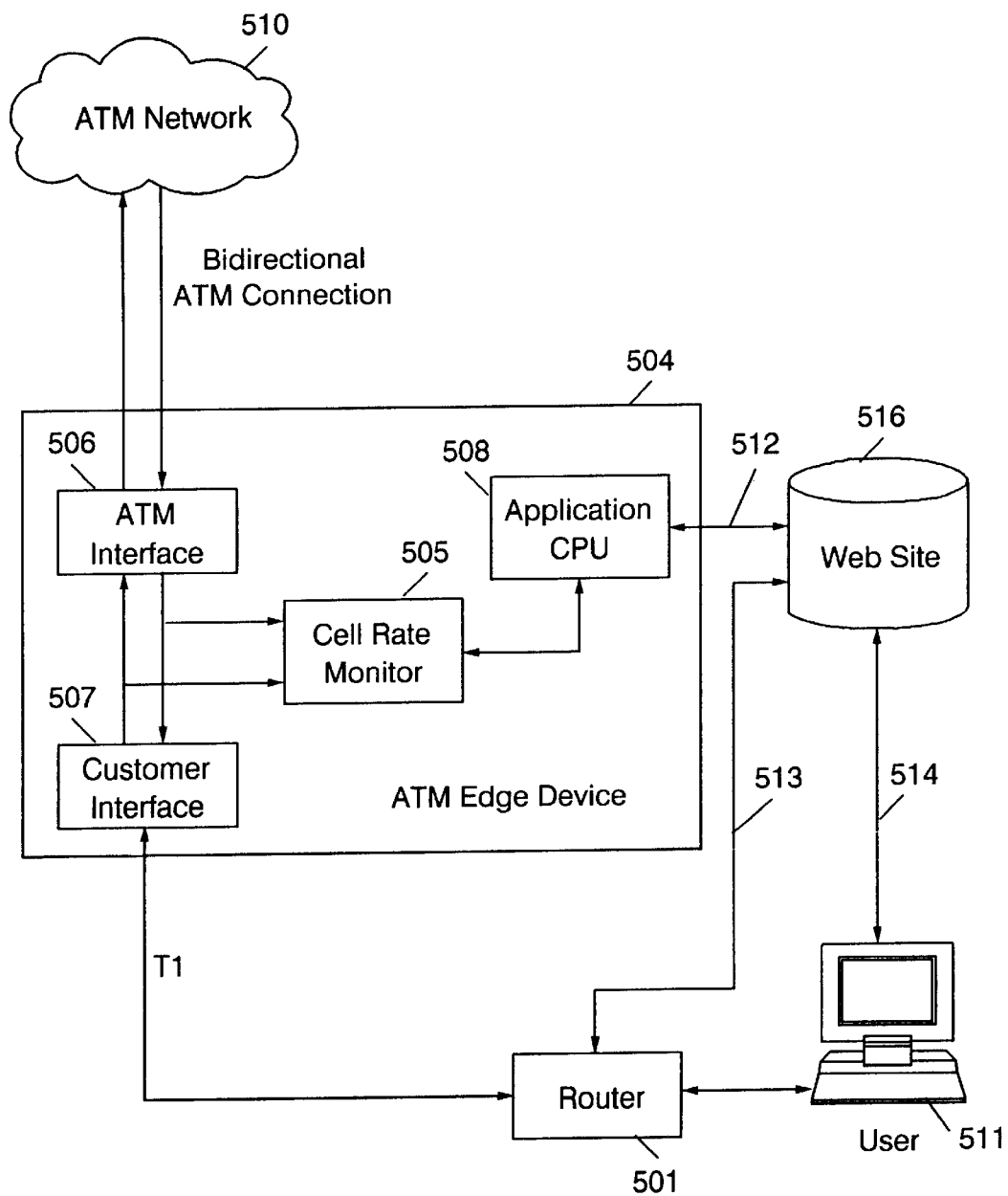
FIG. 5 shows another embodiment of a network in which the present invention might be implemented.

FIG. 5 illustrates the web site implementation. In FIG. 5, reference numbers 501, and 504–508, point to functional elements, which are the same as those indicated by 101 and 104–108 in FIG. 1. In this case however, web site 516 maintains usage statistics for users. A user at 511 can access these statistics via an Internet or intranet connection as shown at 514. Web site 516 is usually implemented by a workstation with sufficient storage and software to store the statistical data and format it for graphical display on a web browser on the workstation of user 511. In this example, the user workstation is the same workstation that accesses the ATM network 510 through the router 501 and ATM edge device 504. However, these can be two different workstations. It is also important to note that the path to the web server could be through the same physical connections as the data path, that is, through the ATM edge device. However, it would be a different logical connection and so is shown as a separate path in FIG. 5. The router has software installed which allows it to access the usage statistics over the connection at 513. The web site accesses statistics from the cell rate monitor 505 through the application CPU 508 via the network connection 512 to the ATM edge device. Again, this can be a dedicated connection for this purpose, or it can be a signal path using some of the same physical resources as some of the other connections in the network. In either case, it is a logically distinct connection.

Two examples are given which illustrate the statistics collection and distribution capabilities. The first, based on the method illustrated by the flowchart of FIG. 4, illustrates a simple technique by which an intelligent router can use access to the statistics to automatically adjust its connection to an ATM edge device. The second shows how a user might view the usage statistics collected for a subnet maintained by an intelligent router.

As an example, consider again the system shown in FIG. 1. An intelligent router is connected via a T1 line to ATM edge device 104. It is assumed in this example that over a period of one month the cell rate monitor (CRM) has accumulated a statistics profile of the activity of this router on a time of day basis. This profile is shown in FIGS. 2 and 3. It is also assumed that the network is designed so that the router downloads a complete set of statistics from the CRM when needed.

Step 1—Router downloads statistics profile

On a periodic basis, the router establishes a connection to the ATM edge device to download the latest usage profile. This profile is stored in the router for future reference when establishing user connections.

Step 2—First user logs on

At 3:00 AM User 1 logs on to Workstation 1 on the router's subnet.

Step 3—Router initiates an ATM connection

It is the router's responsibility to negotiate the parameters of the initial connection to the ATM edge device. Once this connection has been established, new users logging onto workstations on the router's subnet will cause the bandwidth requirements to increase. The router examines the usage profile shown in FIG. 3 for the given time of day and negotiates the cell rate parameters of the connection accordingly.

Step 4—Second user logs on

A second user logs on at 7:30 AM. Again the router examines the usage profile for this time of day and initiates a new ATM connection with an increased cell rate. It redirects all traffic onto the new ATM connection and terminates the previous ATM connection.

Step 5—Users begin logging off at end of day

As the day goes on, the router continues to create new connections as determined by the usage profile. As users begin to log off at the end of the day, the requested Peak Cell Rate (PCR) of new connections dwindles until the last user logs off. At this point the last ATM connection is terminated.

The next example illustrates how a user might access the statistics collected by the cell rate monitor in the ATM edge device. There are two ways that this can be accomplished, either through a web site maintained by the service provider or via a download from the ATM edge device to the user's workstation. It is again assumed that over a period of one month the cell rate monitor (CRM) has accumulated a statistics profile of the activity of the router on a time of day basis.

Step 1—User Requests Statistics Download

Via a custom software package or a web browser running on the user's workstation the user requests a display of the usage statistic for the router. A separate virtual connection is created in addition to the one already dedicated to user traffic, either to the edge device through the router, or to the web site.

Step 2—Download

The edge device downloads the statistics in a format understood by the software running on the user's workstation, either the custom software or a web browser. If custom software is used, the statistics are downloaded to the router. If web access is used, the statistics are downloaded to the web site.

Step 3—Statistics Display

The user interacts with either the custom software or the web site to specify the type and format of desired statistical display(s).

In the above example, the web site is updated whenever a user requests a download. It is also possible to design the system so that the web site requests updates at regular intervals and keeps the cell rate profile "at the ready" for user download requests. Such an arrangement is advantageous in terms of access speed.

Figure 6:
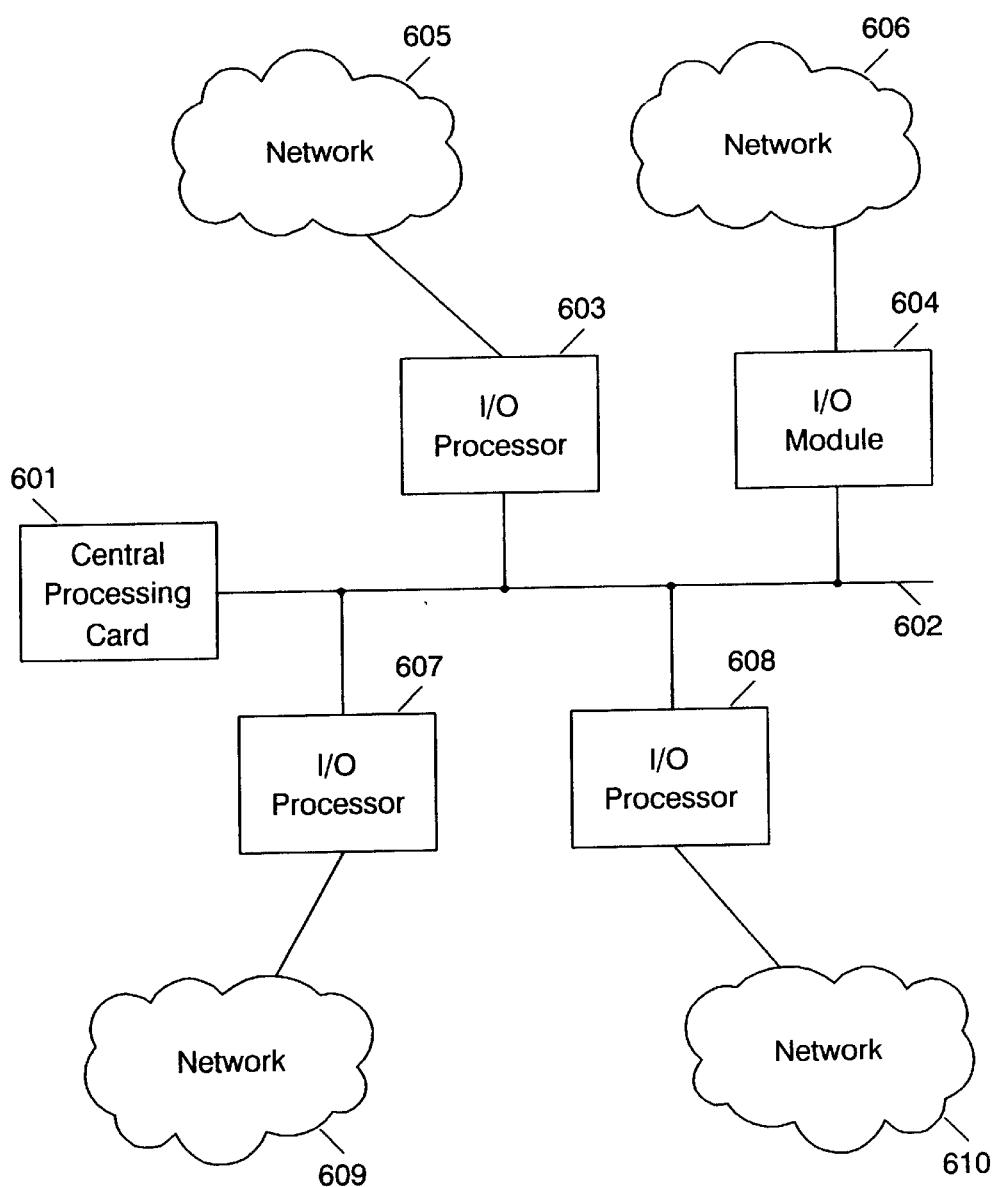
FIG. 6 is a functional block diagram of a router that may be used to implement the method of the present invention.

The automated negotiation method according to the invention is executed by a router which provides the virtual connections for users. FIG. 6 illustrates a block diagram of a router that executes the method of the invention. The router includes a central processing card, 601, coupled to a high-speed parallel bus, 602. The central processing card includes memory and connections for media devices (not shown). The central processing unit on the processing card, together with the memory and other supporting components provide the means to execute the computer program code of the invention. A plurality of input/output (I/O) processors, 603, 607, and 608 are coupled to the bus to provide I/O functions for connected networks 605, 609 and 610. An input/output module, 604, provides a connection for network 606. These networks may be one-in-the same or simply logical entities within a larger network.

The difference between the I/O module and I/O processor used in a router is found in the amount of function provided by each device. A router can be configured with one or the other or both. An I/O module typically includes one network connection and a media access control (MAC) chip. This chip is coupled to a bus interface chip, either directly or through supporting circuitry. An I/O processor typically includes multiple interfaces and/or MAC chips, an internal bus of its own, and may provide for connections to multiple networks. An I/O processor can share some of the processing duties of the central processor card, including some of the steps required to perform the present invention. A detailed description of a router that might be used to implement the present invention can be found in U.S. Pat. No. 5,592,622, issued Jan. 7, 1997, which is incorporated herein by reference.

Figure 7:
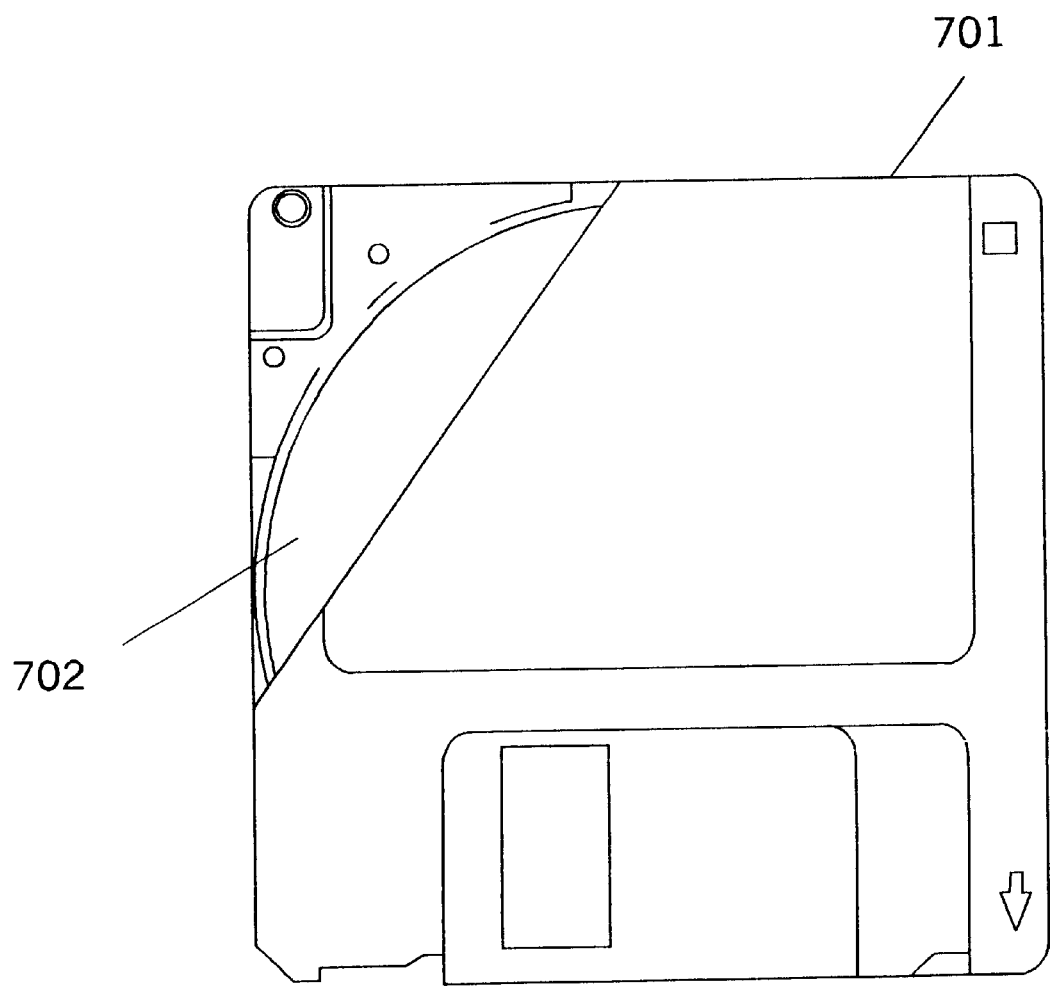
FIG. 7 illustrates a storage medium on which computer program code that implements the present invention might be stored.

As previously mentioned, appropriate computer program code in combination with appropriate hardware implements most of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the workstation over the Internet or some other type of network. FIG. 7 illustrates one example of a media. FIG. 7 shows a diskette of the type where magnetic media 702 is enclosed in a protective jacket 701. Magnetic field changes over the surface of the magnetic media 702 are used to encode the computer program code. In this way the computer program code is stored for later retrieval.

I have described specific embodiments of my invention, which provides a method for efficiently negotiating quality-of-service parameters for a network virtual connection. One of ordinary skill in the networking and programming arts will quickly recognize that the invention has other embodiments. In fact, many implementations are possible. The following claims are in no way intended to limit the scope of the invention to the specific embodiments described.

I claim:

1. A method of negotiating a network connection using statistical quality-of-service (QoS) parameter information related to one or more QoS parameters, the method comprising the steps of:

determining a current time;

accessing at least one statistical QoS parameter value from the statistical QoS parameter information, the statistical QoS parameter value corresponding to the current time;

determining if at least one current QoS parameter value is substantially equal to the at least one statistical QoS parameter value, the current QoS parameter value and the statistical QoS parameter value being for the same QoS parameter, the at least one current QoS parameter value relating to an existing virtual connection for the network connection; and if the current QoS parameter value is not substantially equal to the statistical QoS parameter value, negotiating a new virtual connection for the network connection using the statistical QoS parameter value and routing traffic to the new virtual connection.

2. The method of claim 1 further comprising the step of terminating the existing virtual connection if a new virtual connection is negotiated.

3. The method of claim 2 further comprising the steps of:

determining, after the accessing step, if the statistical QoS parameter value is equal to zero; and if the statistical QoS parameter value is equal to zero, resetting the statistical QoS parameter to a minimum value.

4. The method of claim 2 further comprising the steps of, after a specific time period has passed:

determining if there has been traffic during the specific time period;

terminating the new virtual connection if there has not been traffic during the specific time period; and repeating the method if there has been traffic during the specific time period.

5. The method of claim 3 further comprising the steps of, after a specific time period has passed;

determining if there has been traffic during the specific time period, terminating the new virtual connection if there has not been traffic during the specific time period; and repeating the method if there has been traffic during the specific time period.

6. Apparatus for negotiating a network connection using statistical quality-of-service (QoS) parameter information related to one or more QoS parameters, the apparatus comprising:

means for determining a current time;

means for accessing at least one statistical QoS parameter value from the statistical QoS parameter information, the statistical QoS parameter value corresponding to the current time;

means for determining if at least one current QoS parameter value is substantially equal to the at least one statistical QoS parameter value, the current QoS parameter value and the statistical QoS parameter value being for the same QoS parameter, the at least one current QoS parameter value relating to an existing virtual connection for the network connection; and means for negotiating a new virtual connection for the network connection using the statistical QoS parameter value and routing traffic to the new virtual connection.

7. A computer program product for negotiating a network connection using statistical quality-of-service (QoS) parameter information related to one or more QoS parameters, the computer program including media with a computer program embodied thereon, the computer program comprising:

computer program code for determining a current time;

computer program code for accessing at least one statistical QoS parameter value from the statistical QoS parameter information, the statistical QoS parameter value corresponding to the current time;

computer program code for determining if at least one current QoS parameter value is substantially equal to the at least one statistical QoS parameter value, the current QoS parameter value and the statistical QoS parameter value being for the same QoS parameter, the at least one current QoS parameter value relating to an existing virtual connection for the network connection; and computer program code for negotiating a new virtual connection for the network connection using the statistical QoS parameter value and routing traffic to the new virtual connection.

8. The computer program product of claim 7 wherein the computer program further comprises computer program code for terminating the existing virtual connection if a new virtual connection is negotiated.

9. The computer program product of claim 7 wherein the computer program further comprises:

computer program code for determining when a specific time period has passed;

computer program code for determining if there has been traffic during the specific time period; and computer program code for terminating the new virtual connection if there has not been traffic during the specific time period.

10. The computer program product of claim 8 wherein the computer program further comprises:

computer program code for determining when a specific time period has passed;

computer program code for determining if there has been traffic during the specific time period; and computer program code for terminating the new virtual connection if there has not been traffic during the specific time period.

11. Apparatus for connection to a network, the apparatus including a processor and a plurality of adapters, the apparatus also including a computer program for enabling the apparatus to negotiate a network connection using statistical quality-of-service (QoS) parameter information related to one or more QoS parameters, the computer program comprising:

computer program code for enabling the apparatus to determine a current time;

computer program code enabling the apparatus to download at least one statistical QoS parameter value from the statistical QoS parameter information, the statistical QoS parameter value corresponding to the current time;

computer program code enabling the apparatus to determine if at least one current QoS parameter value is substantially equal to the at least one statistical QoS parameter value, the current QoS parameter value and the statistical QoS parameter value being for the same QoS parameter, the at least one current QoS parameter value relating to an existing virtual connection for the network connection; and computer program code for enabling the apparatus to negotiate a new virtual connection for the network connection using the statistical QoS parameter value and routing traffic to the new virtual connection.

12. The apparatus of claim 11 wherein the computer program further comprises computer program code for enabling the apparatus to terminate the existing virtual connection if a new virtual connection is negotiated.

13. The apparatus of claim 11 wherein the computer program further comprises:

computer program code for enabling the apparatus to determine when a specific time period has passed;

computer program code for enabling the apparatus to determine if there has been traffic during the specific time period; and computer program code for enabling the apparatus to terminate the new virtual connection if there has not been traffic during the specific time period.

14. The apparatus of claim 12 wherein the computer program further comprises:

computer program code for enabling the apparatus to determine when a specific time period has passed;

computer program code for enabling the apparatus to determine if there has been traffic during the specific time period; and computer program code for enabling the apparatus to terminate the new virtual connection if there has not been traffic during the specific time period.

15. A cell-based communication network in which a network connection is negotiated using statistical quality-of-service (QoS) parameter information related to one or more QoS parameters, the network comprising:

an edge device including a central processing unit (CPU) and a network interface, the edge device further including a cell rate monitor connected to the network interface which is operable to capture cells and store the statistical QoS parameter information; and a router connected to the edge device, the router operable to negotiate a virtual connection for the network connection using at least one statistical QoS parameter value selected from the statistical QoS parameter information.

16. The network of claim 15 further comprising:

a web server connected to the router and the edge device, the web server operable to access the statistical QoS parameter information from the cell rate monitor, the web server also operable to create a graph of one or more QoS parameter values; and a user terminal connected to the web server and the router, the user terminal operable to display the graph so that a QoS parameter value can be chosen by a user and forwarded to the router.

17. The network of claim 15 wherein a user terminal is connected to the router, and wherein the user terminal is operable to access the statistical QoS parameter information from the cell rate monitor through the router and create a graphical display of one or more QoS parameter values so that a QoS parameter value can be chosen by a user and forwarded to the router.

18. The network of claim 15 wherein the router is further enabled to automatically negotiate the network connection by performing the steps of:

determining a current time;

accessing at least one statistical QoS parameter value from the statistical QoS parameter information, the statistical QoS parameter value corresponding to the current time;

determining if at least one current QoS parameter value is substantially equal to the at least one statistical QoS parameter value, the current QoS parameter value and the statistical QoS parameter value being for the same QoS parameter, the at least one current QoS parameter value relating to an existing virtual connection for the network connection; and if the current QoS parameter value is not substantially equal to the statistical QoS parameter value, negotiating a new virtual connection for the network connection using the statistical QoS parameter value and routing traffic to the new virtual connection.

19. The network of claim 16 wherein the router is further enabled to automatically negotiate the network connection by performing the steps of:

determining a current time;

accessing at least one statistical QoS parameter value from the statistical QoS parameter information, the statistical QoS parameter value corresponding to the current time;

determining if at least one current QoS parameter value is substantially equal to the at least one statistical QoS parameter value, the current QoS parameter value and the statistical QoS parameter value being for the same QoS parameter, the at least one current QoS parameter value relating to an existing virtual connection for the network connection; and if the current QoS parameter value is not substantially equal to the statistical QoS parameter value, negotiating a new virtual connection for the network connection using the statistical QoS parameter value and routing traffic to the new virtual connection.

* * * * *